Sept. 20, 1960    I. P. RODMAN ET AL    2,953,059
OPTIMUM APERTURE RATIO FOR TRANSCEIVER
Filed Aug. 5, 1957

INVENTORS
ISAAC P. RODMAN
JAMES L. WINGET
BY
ATTORNEYS even# United States Patent Office 2,953,059
Patented Sept. 20, 1960

2,953,059
OPTIMUM APERTURE RATIO FOR TRANSCEIVER

Isaac P. Rodman, Mount Vernon, and James L. Winget, White Plains, N.Y., assignors, by mesne assignments, to the United States of America as represented by the Secretary of the Navy Filed Aug. 5, 1957, Ser. No. 676,450

6 Claims. (Cl. 88—1)

This invention relates to optical transmitter and receiver combinations for transmitting light signals and receiving echo light signals reflected back from target objects, and is more particularly related to composite concentric optical transmitter-receiver or "transceiver" devices in which an optimum transmitter reflector and receiver reflector ratio is provided to obtain the maximum signal-to-noise ratio at the receiver.

In known optical transmitter and receiver combinations the transmitter and receiver are made separately and are used at spaced positions so that the transmitted signal is reflected back through some angle from a target object to the optical receiver. Such known devices present problems of accurately directing each transmitter and receiver for target objects picked up in space and of coordinating the transmitter and receiver relation for object tracking. This means that any tracking mechanism must be accurate not only for the transmitter component but also for the receiver component to obtain proper range or other information provided by the combination. Also, parallax must be accounted for in such known combinations.

In the present invention a composite transmitter and receiver device of optical signals is provided through the use of annular transmitter and receiver reflectors so that transmitted and received signals are transmitted and received concentrically or coaxially to and from a target object, whereby the target object may be more easily followed and its range more accurately determined. It has been found that if the beam of an optical receiver intersects the transmitted beam at a relatively sharp angle, as known to occur in prior devices referred to above, a false signal echo is produced by atmospheric back scattering. This false signal has characteristics very similar to a true echo signal from a target. In the present invention providing a coaxial system the back scattering effect produces a rise time of echo reference at the start which gradually decays with time. This wave shape is entirely different from a true target echo and can be readily discriminated by suitable circuitry. In this invention an annular parabolical transmitter reflector transmits light pulses in parallel rays in an annular bundle circumferentially of an annular receiver aspheric reflector, which latter reflector is oriented in the same direction as the transmitter reflector and also lies on a common or conjugate axis with the transmitter reflector. The difficult problem in the present invention is to obtain the optimum aperture ratio of the transmitter and receiver reflectors in order to obtain the maximum signal-to-noise ratio of echo light signals received by the receiver reflector. In the present invention it was found that the area of the receiver reflector or mirror should be one-third of the area bounded by the periphery of the transmitter reflector or mirror. This one-third area of the receiver reflector or mirror in this composite concentric transmitter receiver combination amounts to a one-third "shadow area" which the receiver mirror would project onto the transmitter mirror. A light source such as a flash lamp having a high instantaneous power peak of short duration is positioned at the focus of the transmitter reflector or mirror to reflect an annular bundle or beam into space of very high intensity. A light responsive means is positioned to be struck by the light rays produced by the flash lamp, and a light sensitive detector is positioned at the focus of the receiver reflector or mirror to detect the echo light signals reflected back from a target object. In order to maintain the compactness of the composite transmitter and receiver combination, which combination may hereinafter be referred to as a "transceiver", a secondary mirror is used in the light path of the received echo light signals between the receiver mirror and its focus directing the echo signals in reverse direction so that the light sensitive detector may be placed in the opening of the annular receiver reflector or mirror. The light signal produced by the flash lamp and received by the light responsive means and the echo light signal received by the light sensitive detector are converted in these light sensitive means to electrical signals which are applied to an indicating means such as, for example, an oscilloscope, to indicate the occurrence of the transmitted signal and the received echo signal with respect to transit time or time interval, whereby the range of a target object in space reflecting the echo signal may be determined or calculated. It is therefore a general object of this invention to provide a composite optical transceiver having an optimum aperture ratio of the transmitter and receiver reflecting elements to provide the maximum signal-to-noise ratio of echo signals received by the receiver component of the transceiver to provide accurate signal response in determining the range of any object in space reflecting back echo optical signals.

These and other objects, advantages, features, and uses may become more apparent as the description proceeds when considered with the drawing illustrating, but not limiting, a preferred embodiment of the transceiver in which.

Figure 1:
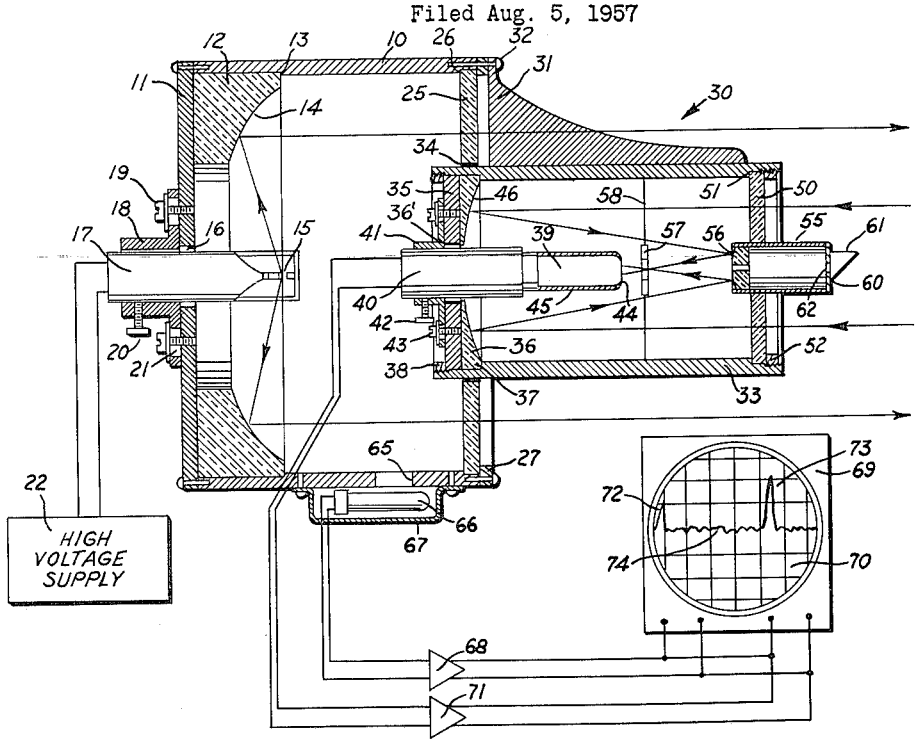
Figure 1 illustrates partly in section and partly in circuit schematic and block diagram a transceiver made in accordance with the concept of this invention, the cross sectional view of the transceiver being taken on the line 2—2 of Figure 2 looking in the direction of the arrows.
Figure 2:
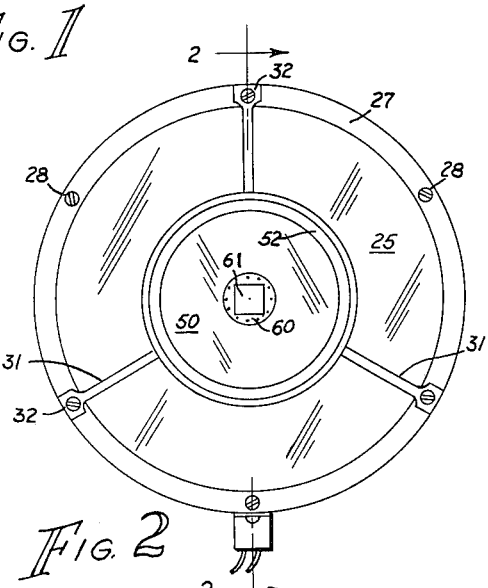
Figure 2 shows a front face elevational view of the transceiver.

Referring more particularly to Figure 1, with occasional reference to Figure 2 for parts illustrated on the face of the transceiver, the transceiver is supported by a case 10 which is preferably cylindrical. The left end of the case 10, as seen in Figure 1, has an end plate 11 fixed thereto in any suitable manner, as by cap screws or the like. The end plate 11 positively holds an annular reflector element 12 in any suitable manner, but is herein shown as supporting the reflector element 12 against a shoulder 13 in the cylindrical case 10. The reflector element 12 may be of any suitable material but is herein illustrated as a glass element having a parabolical front face reflector surface 14 producing an annular reflector surface of revolution with the focus thereof for parallel rays at a point 15 lying at the intersection of the optical axis and the lines of greatest diameter. The end plate 11 has a central opening 16 in which opening is supported a flash lamp 17 with its spaced electrodes precisely at the point of focus 15. The flash lamp 17 may be supported by any suitable adjustable means, but is herein illustrated for convenience as being supported by a flanged element 18 with the flange thereof held on the outer surface of the end plate 11 by cap screws 19. The neck of the support 18 has a set screw 20, or the like, operative to engage the flash lamp 17. The openings 21 for the cap screws 19 may be enlarged to permit vertical and horizontal adjustment of the support 18 where, by the use of the cap screws 19 and the set screw 20, the flash lamp 17 may be positioned accurately for proper focus. In actual practice the adjustable means may be by tracks and threaded screws so that adjustments may be made without loosening the support, as is well understood in the art. The flash lamp 17 may be of any suitable, well known type, such as the type shown in the Letters Patent of V. H. Fraenckel et al., bearing the Patent Number 2,409,030, granted on October 8, 1946. The flash lamp 17 is supplied by high voltage from the source at 22 which will cause periodic flashes in accordance with the internal capacity structure of the flash lamp.

The forward end of the transceiver, hereinafter understood to be the right end, as seen in Figure 1, is closed in part by an annular glass plate or window 25 which may be held in position against a shoulder 26 on the cylindrical case 10 by a ring 27 held by cap screws 28 threaded into the cylindrical case 10. A receiver component, referred to generally by the reference character 30, is supported by three spider members or vanes 31 attached to the cylindrical case 10 by cap screws 32 mounted through the ring 27. The receiver component 30 must be very accurately aligned, which may be accomplished by metal dowell pins cooperating with openings in the spider members 31 and the cylindrical case 10 in the well known and understood manner, but not shown herein. The spider members 31 are fixed or otherwise attached to a cylindrical case member 33, which member projects rearwardly through the central opening of the annular glass plate or window 25. For all practical purposes an effective seal at 34 may be provided in any manner well understood in the art to prevent foreign atmospheric particles from entering the cylindrical case 10. The left end of the cylindrical case 33, as viewed in Figure 1, has an end wall 35 which is pressed against an annular receiver reflector element 36 engaging a shoulder 37 in the cylindrical case 33. The members 35 and 36 may be removably supported in any well known manner, but are herein illustrated as being held in position by an annular ring 38 threadedly engaging the cylindrical member 33. The end plate 35 has a central opening 36 in which a light sensitive detector tube or multiplier phototube 39 may be supported on a socket means 40 which, in turn, is held on the end plate 35 in the same manner as the flash lamp 17 is supported on the end plate 11. That is, a flanged member 41 having a set screw 42 therein to engage the tube base 40 and having cap screws 43 passing through elongated slots in the flanged member 41 and threadedly engaging the end plate 35 makes it possible to adjust the light sensitive detector tube 39 in any direction. The light sensitive detector tube 39 is herein illustrated as the type to be responsive to light falling on its end face portion 44. In practice the tube 39 may have a shield 45 to eliminate stray ambient light. The receiver reflector element 36 may be of any suitable material, but is illustrated herein as being glass having a front surface mirrored portion 46 that is aspherical of a focal length to produce a focal plane well in front of the tube 39.

The front end of the cylindrical case 33 is closed by an annular glass plate or window 50 supported against a shoulder 51 in the cylindrical case 33, as by a threaded annular ring 52. Supported in the central opening of the glass plate 50 is a small cylindrical case 55 which may be affixed to the inner periphery of the glass plate 50 by any suitable means to support the small cylindrical case 55 in a stable manner. The back end of the small cylindrical case 55 supports a small mirror or reflector element 56 having a front mirrored spherical surface directed rearwardly to reflect secondarily the echo light signals reflected by the receiver reflector 36 to the end portion 44 of the tube 39. The secondary mirror or reflector 56 is in the light path of the received echo signals between the receiver reflector 36 and its focal point. The tube 39 is positioned slightly behind the focal plane of the receiver reflector 36 sufficiently to allow room for an adjustable stop 57 to be positioned exactly in the focal plane. The stop 57 may be supported by a spider 58 from the inner wall of case 33 with the adjustment means extending to the exterior through one of these spider arms. In this manner the receiver component 30 may be operated for all operative conditions of receiving echo light signals.

For the purpose of aligning the tube 39, viewing the stop 57, and adjusting the focal length determined by the receiver mirror 36 and secondary mirror 55, the outer end plate 60 of the cylindrical case 55 supports a glass prism 61 with one side fixed to the end plate 60 over an opening 62 on the optical common or conjugate axis of the transceiver. The secondary mirror or reflector 56 may have either a small hole concentrically thereof lying on the common optical axis or the reflecting surface may be removed at the central portion, providing a transparent opening for viewing along the optical common axis from a lateral position. The prism 61 is used only for aligning the receiver component and is not intended to be left on the instrument in the practical use thereof. The end plate 60 supporting prism 61 may be removed and a solid light impervious end plate placed thereon in the well known manner. The prism 61 provides a means of aligning the receiver component from a point removed from the parallel rays transmitted or the echo rays received by the transceiver.

The cylindrical case 10 has an opening 65 in the side wall thereof in a position which would allow rays of light from the flash lamp 17 to pass therethrough. On the exterior of the cylindrical case 10 over the opening 65 is a light responsive means 66, such as a photoelectric (P.E.) cell, which is enclosed in a case 67. The P.E. cell 66 is coupled through an amplifier 68 to the horizontal and vertical circuits of an indicator device 69, herein illustrated for the purpose of this invention as an oscilloscope, having a screen 70. The light sensitive detector tube 39 in the receiver component 30 is coupled electrically through an amplifier 71 to the vertical circuits of the oscilloscope 69. The transmission of a light pulse and the reception of an echo light pulse or signal will be indicated on the fluorescent screen 70 of the oscilloscope 69 in a manner well understood by those mechanics skilled in the art. The P.E. cell 66 through its amplifier may be coupled to the horizontal and vertical circuits of the oscillioscope 69 in such a manner to initiate the horizontal drive of the oscilloscope beam and at the same time to present a visual pip, such as 72, at the beginning of this horizontal drive. The pip 72 is caused by the light flash from the flash lamp 17 being picked up by the P.E. cell 66. A pip 73 on the screen 70 of the oscilloscope 69 indicates the reception of an echo signal in the receiver component 30 as detected by the tube 39. The irregular horizontal trace 74 indicates the noise light signals received by the receiver component 30 before and after the reception of the echo signal 73. "Noise," as used in this description, means all light signals received by the receiver component 30 other than the actual echo light signals produced by the transmitted signal from the transmitter reflector 12. That is, the noise light signals may result from ambient light, such as the sunlight reflecting on atmospheric particles or on the target object itself. The noise factor is of considerable concern, as will be made clearer hereinafter. The particular circuitry and the type of indicator used form no real part of this invention and may be of a type of circuit combination and indicator as shown and described by the patent to V. H. Fraenckel et al., as referred to hereinbefore.

In providing a composite transceiver, as shown in Figures 1 and 2, it is important to control the aperture ratio of the transmitter and receiver components in order to provide the maximum signal-to-noise ratio of echo signals received by the receiver component 30. For the purpose of explaining the optimum aperture ratio, let it be assumed that $A_t$ is the area bounded by the periphery of the transmitter reflector or mirror 12 and that $A_r$ represents the area within the periphery of the receiver reflector or mirror 36. It has been found that the echo signals or received light signals represented by S vary proportionally as the product of the difference between the areas of the transmitter and receiver mirrors and the area of the receiver mirror; that is, $$S \sim (A_t - A_r) A_r$$

It has also been found that optical noise signals, represented herein by N, varies as the square root of the area of the receiver mirror, or $$N \sim \sqrt{A_r}$$

From these findings the signal-to-noise ratio may be determined readily thus:

$$\frac{S}{N} = \frac{(A_t - A_r) A_r}{\sqrt{A_r}} = (A_t - A_r)\sqrt{A_r} = (A_t - A_r) A_r^{1/2}$$

Taking the first derivative we find $$\frac{d\frac{S}{N}}{dA_r} = -A_r^{1/2} + (A_t - A_r)\frac{1}{2}A_r^{-1/2} = 0$$

$$-2A_r + A_t - A_r = 0$$
$$-3A_r + A_t = 0$$
$$A_t = 3A_r$$

This indicates that the optimum aperture ratio for the two transmitter and receiver mirrors is 3:1; that is, the area bounded by the periphery of the transmitter mirror 12 is three times the area bounded by the periphery of the receiver mirror 36. Also, the receiver mirror 36 actually shadows one-third of the total area bounded by the periphery of the transmitter mirror 12. By taking the second derivative of the function $$\frac{d\frac{S}{N}}{dA_r}$$

it may be found that this ratio of 3:1 is a maximum. It also may be found that the area of the operative reflecting surface of the transmitter mirror 12 is approximately twice the operative reflecting area of the receiver mirror 36.

Figure 3:
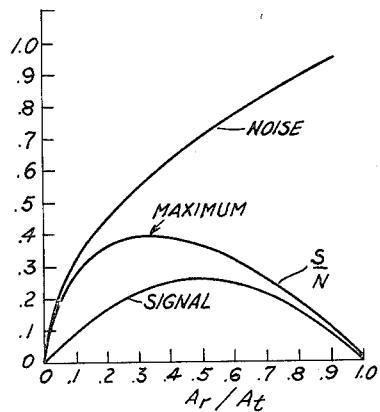
Figure 3 shows a graph illustrating the curves of signal, noise, and signal-to-noise ratio.

Referring more particularly now to Figure 3, there is shown a graph representing the optical signal, the optical noise signal, and the signal-to-noise ratio. The abscissa and ordinate scales are chosen for convenience merely to illustrate these curves, but for the purpose of the signal-to-noise ratio curve the abscissa scale may be taken as $$\frac{A_r}{A_t}$$

The optical noise curve illustrates the finding that $$N \sim \sqrt{A_r}$$

The point identified as maximum on the $$\frac{S}{N}$$

curve shows that the optimum aperture ratio is .333, which bears out the mathematical analysis given above.

While it is believed that the operation of the device is clear from the prior description, a brief discussion of the operation will be given to clarify the results obtained by the use of concentric transmitter and receiver components. Upon a flash taking place between the electrodes at the point 15 of the flash lamp 17, the rays of this flash will be reflected from the parabolical reflector surface 14 directing parallel rays circumferentially about the receiver component 30 through the glass plate or window 25, as shown by the lines and arrows. When these transmitted rays strike an object in space, echo rays will be reflected back through the window 50 to the aspheric surface 46 of the receiver mirror 36, which rays are secondarily reflected from the spherical surface 56 to the end portion 44 of the tube 39. While any suitable light sensitive tube 39 may be used, a multiplier phototube has been found preferable in the amplification of the reflected echo optical signals. At the time the flash lamp 17 flashes to transmit the optical signal, P.E. cell 66 becomes responsive and operative to start the horizontal trace on the screen 70 of oscilloscope 69 and at the same time is operative on the vertical circuit which includes proper time delay components to establish an initial pip 72. During the interval between transmission of a light signal and reception of the echo signal, optical noise signals are received, as shown by 74, and thereafter the echo signal will be received, as indicated at 73, which is generated by the echo light signal striking the tube 39. The screen of the oscilloscope may be indexed to represent either or both microseconds of time interval and range in yards, whereby it may be determined readily from the position of the pips 72 and 73 on the index screen the exact range of the target object which reflected the echo optical signal, the time index being directly calibrated in range since the speed of light and the speed of the horizontal trace of the oscilloscope 69 are known. The novel aperture ratio existent of the transmitter and receiver mirrors, as conceived herein, makes it possible to obtain the maximum echo signal relative to noise optical signals constantly being received. Any departure from this optimum aperture ratio would cause the noise signals 74 to increase with respect to the transmitted and received signals, as represented by the pips 72 and 73. By finding the optimum aperture ratio of transmitter and receiver mirrors for optical signals, the provision of a composite transceiver is accomplished and it operates more effectively as a composite body than in separate components and avoids disadvantages of parallax and difficult tracking existent in spaced transmitter and receiver components.

While the transceiver shown and described herein is illustrated only by a preferred embodiment of the invention, it is to be understood that many modifications and changes in constructional details and features may be made without departing from the spirit and scope of this invention and we desire to be limited only by the scope of the appended claims.

We claim:

1. A concentric optical signal transceiver ranging device having optimum aperture ratio comprising; transmitter and receiver annular mirrors coaxially arranged in spaced relation along a conjugate axis and oriented in the same direction, said receiver mirror being in front of said transmitter mirror and about one-third the area bounded by the periphery of said transmitter mirror thereby producing an optimum signal-to-noise ratio, each mirror having an aspheric concave surface with the transmitter mirror coming to a focus behind said receiver mirror; case means enclosing said mirrors with an annular window around said receiver mirror to permit the transmission of light signals from the transmitter mirror into space and with a window in said case means in front of said receiver mirror to permit the return of echo light signals from an object to fall on said receiver mirror; light pulse source means adjustably fixed at the focus of said transmitter mirror to emit reflected parallel light ray light signal pulses through said annular window; detector means on said case means exposed to said light pulse source means for detecting light pulses emitted; a secondary reflector in the light path of said receiver mirror preceding its focal point; a light responsive means in the light path of said receiver mirror approximate the focal point to detect the echo light signals from a reflecting object; and means coupled to said detector means and said light responsive means for determining the time interval between each emitted light pulse and echo light pulse whereby the range of a reflecting object may be calibrated.

2. A transceiver ranging device as set forth in claim 1 wherein said annular transmitter mirror aspheric surface is parabolical with the focal point lying on the lines of maximum diameter of the transmitter mirror.

3. A transceiver ranging device as set forth in claim 2 wherein said light pulse means is a flash lamp having a high instantaneous power peak of short duration, said light responsive means and said detector are each capable of converting light energy to electrical energy, and said means coupled to said detector and to said light responsive means is electrically responsive to indicate the relationship in time of the light pulse and echo pulse occurrence.

4. A transceiver ranging device as set forth in claim 3 wherein said light responsive means is a photomultiplier tube and said detector is a photoelectric cell.

5. A concentric optical signal transceiver ranging device having optimum aperture ratio comprising; annular transmitter and receiver mirrors oriented in the same reflective direction along a conjugate axis with the receiver mirror being in front and about one-third of the area bounded by the outer periphery of said transmitter mirror thereby producing an optimum signal-to-noise ratio, said mirrors each having aspheric concave mirrored surfaces; a case supporting said mirrors and having an annular window surrounding said receiver mirror for transmitting light pulses reflected from said annular transmitter mirror and having a window in front of said receiver mirror for permitting echo light signals to reach said receiver mirror; a secondary mirror on the conjugate axis in front of said receiver mirror to reflect echo light signals from said receiver mirror to a focus toward said receiver mirror; an adjustable stop at the focus of said receiver mirror; a transparent opening through said secondary mirror on the conjugate axis adapted for alignment of a boresight prism in front of said transparent opening for boresight aligning of said receiver mirror and stop; a high instantaneous peak light pulse source at the focus of said transmitter mirror behind said receiver mirror for producing parallel light pulses through said annular window into space; a light sensitive detector positioned on said case to receive light from said light pulse source; a light responsive means adjustably supported in the light path of said receiver mirror behind said stop to receive echo light signals reflected from said transmitted light pulses by a reflecting object; and means coupled to said light sensitive detector and said light responsive means for indicating the time interval between transmitted and echoed light signals.

6. A transceiver ranging device as set forth in claim 5 wherein said light responsive means is adjustably supported concentrically within said annular receiver mirror, said secondary mirror is spherically convex, and said aspheric concave annular mirror surface of said transmitter mirror is parabolical with the focus lying on the point of intersection of the conjugate axis and lines of maximum diameter thereof.

References Cited in the file of this patent
UNITED STATES PATENTS

| | | |
|---|---|---|
| 2,409,030 | Fraenckel | Oct. 8, 1946 |
| 2,424,193 | Rost | July 15, 1947 |
| 2,468,042 | Cranberg | Apr. 26, 1949 |
| 2,490,899 | Cohen | Dec. 13, 1949 |
| 2,493,543 | Merchant | Jan. 3, 1950 |
| 2,506,946 | Walker | May 9, 1950 |
| 2,665,420 | Winterhalter | Jan. 5, 1954 |